United States Patent
Avalur et al.

(10) Patent No.: US 10,097,087 B2
(45) Date of Patent: Oct. 9, 2018

(54) POWER CONVERSION INCLUDING SENSING A LOAD CURRENT AND ADAPTING OUTPUT VOLTAGE BASED ON THE LOAD CURRENT

(71) Applicant: ams AG, Unterpremstaetten (AT)

(72) Inventors: Krishna Kanth Avalur, Hyderabad (IN); Sridhar Setty, Andhra Pradesh (IN)

(73) Assignee: ams AG, Unterpremstaetten (AT)

( * ) Notice: Subject to any disclaimer, the term of this patent is extended or adjusted under 35 U.S.C. 154(b) by 0 days.

(21) Appl. No.: 14/430,903

(22) PCT Filed: Sep. 18, 2013

(86) PCT No.: PCT/EP2013/069357
§ 371 (c)(1),
(2) Date: Mar. 24, 2015

(87) PCT Pub. No.: WO2014/048806
PCT Pub. Date: Apr. 3, 2014

(65) Prior Publication Data
US 2015/0256073 A1 Sep. 10, 2015

(30) Foreign Application Priority Data
Sep. 26, 2012 (EP) .................................. 12186186

(51) Int. Cl.
*H02M 3/158* (2006.01)
*H02M 3/157* (2006.01)
(Continued)

(52) U.S. Cl.
CPC .............. *H02M 3/158* (2013.01); *G05F 1/59* (2013.01); *H02M 3/157* (2013.01); *G05F 1/565* (2013.01);
(Continued)

(58) Field of Classification Search
CPC ...................................................... H02M 3/158
(Continued)

(56) References Cited

U.S. PATENT DOCUMENTS

| | | | | |
|---|---|---|---|---|
| 5,592,072 A | * | 7/1997 | Brown | ...................... G05F 1/40 323/268 |
| 6,031,362 A | | 2/2000 | Bradley | |
| 6,600,362 B1 | | 7/2003 | Gavrila | |
| 2005/0242792 A1 | | 11/2005 | Zinn | |
| 2006/0125455 A1 | * | 6/2006 | Tiew | ...................... H02M 3/156 323/282 |

(Continued)

FOREIGN PATENT DOCUMENTS

| | | |
|---|---|---|
| CN | 102075088 A | 5/2011 |
| JP | 200634025 A | 2/2006 |

*Primary Examiner* — Kyle J Moody
*Assistant Examiner* — Trinh Q Dang
(74) *Attorney, Agent, or Firm* — McDermott Will & Emery LLP (57) ABSTRACT

In one embodiment a power conversion arrangement comprises a switching converter (DC) with an input which is supplied with an input voltage (Vin) and a first output (Out1) to provide a first output voltage (Vout1) as a function of the input voltage (Vin), a linear regulator (LDO1) with an input coupled to the first output (Out1) of the switching converter (DC), the linear regulator (LDO1) having a second output (Out2) to provide a second output voltage (Vout2) as a function of the first output voltage (Vout1) to a connectable electrical load (CS), a component for sensing (MSI) a load current (Iload) at the second output (Out2) of the linear regulator (LDO1), the component being connected to the second output (Out2) of the linear regulator (LDO1), and a unit for influencing (MVA) the first output voltage (Vout1) as a function of the load current (Iload), the unit (MVA) being connected to the first output (Out1) of the switching converter (DC) and to the component for sensing (MSI) the load current (Iload). Furthermore, a power management circuit and a method for power conversion are described.

15 Claims, 5 Drawing Sheets

(51) Int. Cl.
*G05F 1/59* (2006.01)
*G05F 1/565* (2006.01)
*H02M 1/00* (2006.01)

(52) U.S. Cl.
CPC ............... *H02M 2001/0032* (2013.01); *H02M 2001/0045* (2013.01); *Y02B 70/16* (2013.01)

(58) Field of Classification Search
USPC .................................................. 323/266, 268
See application file for complete search history.

(56) References Cited

U.S. PATENT DOCUMENTS

| | | | |
|---|---|---|---|
| 2006/0267562 A1* | 11/2006 | Szepesi .................. | G05F 1/577 323/224 |
| 2007/0279018 A1 | 12/2007 | Sumitomo et al. | |
| 2009/0153108 A1 | 6/2009 | Hendin et al. | |
| 2010/0213909 A1 | 8/2010 | Nakashimo | |
| 2011/0156688 A1* | 6/2011 | Lin ......................... | H02M 1/32 323/284 |
| 2013/0043829 A1* | 2/2013 | Gurlahosur ............ | H02J 7/045 320/107 |
| 2013/0176009 A1* | 7/2013 | Yang ........................ | G05F 1/56 323/274 |
| 2013/0285631 A1* | 10/2013 | Bisson .................... | G05F 1/575 323/280 |
| 2013/0293986 A1* | 11/2013 | Lerner .................... | G05F 1/573 361/18 |
| 2013/0313996 A1* | 11/2013 | Williams .............. | H02M 3/158 315/291 |

* cited by examiner

POWER CONVERSION INCLUDING SENSING A LOAD CURRENT AND ADAPTING OUTPUT VOLTAGE BASED ON THE LOAD CURRENT

The application refers to a power conversion arrangement, a power management circuit and a method for power conversion.

BACKGROUND OF THE INVENTION

In today's power management systems combinations of a switching converter, like a DC/DC converter, with a cascaded linear regulator are common. The DC/DC converter is primarily used to provide a sufficient power conversion to a higher or lower voltage with respect to a supplied voltage. The linear regulator, for example a low drop-out regulator, LDO, is cascaded in series to this switching converter to provide a voltage with accurate output having lower ripple. The output voltage provided by the combination is provided accurately with almost zero ripple.

In known implementations of such cascaded power management systems the switching converter's output voltage is fixed. The linear regulator is designed such that a minimum drop-out voltage across this linear regulator is realized for a predefined peak load current. This results in power inefficiency for all load conditions other than the peak load.

Other known implementations use the output voltage of the linear regulator to generate a feedback signal in a control circuitry to adjust the switching converter. This also results in power inefficiency.

It is therefore an objective to provide a power conversion arrangement and method with enhanced efficiency.

The objective is achieved by the subject-matter of the independent patent claims. Embodiments and developments are subject-matter of the dependent claims.

SUMMARY OF THE INVENTION

In one embodiment a power conversion arrangement comprises a switching converter with a first output to provide a first output voltage, a linear regulator, a component for sensing a load current and a unit for influencing the first output voltage. The switching converter further has an input which is supplied with an input voltage. The first output voltage is provided as a function of the input voltage. The linear regulator has an input coupled to the first output of the switching converter. The linear regulator also comprises a second output to provide a second output voltage as a function of the first output voltage. The second output voltage is provided to a connectable electrical load. The component for sensing the load current is connected to the second output of the linear regulator and are prepared to sense the load current at the second output of the linear regulator. The unit for influencing the first output is connected to the first output of the switching converter and to the component for sensing the load current. The unit for influencing is adapted to influence the first output voltage as a function of the load current.

The switching converter provides the first output voltage as a function of the input voltage. The linear regulator provides the second output voltage as a function of the first output voltage. The load current, which is sensed at the second output of the linear regulator, is used to influence and adapt the first output voltage.

As the power conversion arrangement is enabled to record the actual load current and subsequently adapt the output of the switching converter, a drop-out voltage across the linear regulator is adapted to the actual load situation at the output of the linear regulator. This results in a reduced power dissipation across the linear regulator in light or moderate load conditions. Consequently, the overall power efficiency of the power conversion arrangement is improved.

The electrical load can, for instance, be realized as a current source.

In a development the switching converter comprises a feedback ladder of resistors having a serial connection of resistors. The feedback ladder is connected to the first output of the switching converter. A coupling resistor is provided which is connected to the first output of the switching converter. The coupling resistor forms part of the feedback ladder of the switching converter.

The first output of the switching converter is connected to a reference potential terminal via a serial connection comprising a number of resistors. This serial connection of resistors is called the "feedback ladder". The coupling resistor is the first resistor in this feedback ladder and has a direct connection to the first output of the switching converter.

In a further development the linear regulator comprises a sense transistor coupled to the second output, the sense transistor being prepared to measure the load current.

In a refinement the linear regulator further comprises a pass transistor with a controlled path connected between the input of the linear regulator and the second output. The sense transistor is adapted to form a current mirror in connection with the pass transistor for the load current through the pass transistor.

The load current flows through the path transistor with a controlled path connected between the output of the linear regulator and the second output. The sense transistor is adapted to form a current mirror in connection with the path transistor for the load current through the path transistor.

The load current flows through the path transistor of the linear regulator and is provided to the electrical load. The load current is further mirrored in a current mirror comprising the path transistor and the sense transistor.

In a further embodiment the sense transistor is adapted to provide a sense current as a function of the load current. The sense current is fed back to the first output of the switching converter by means of the coupling resistor, thereby influencing and adapting the first output voltage.

Because of the implemented load sensing the first output voltage of the switching converter can be reduced whenever the sensed load current is lower than a predefined peak current. This is even realized with simple control circuitry and without complex compensation techniques. Furthermore, the proposed power conversion arrangement can be implemented in analog fashion. Consequently, there is no need for any complicated digital technologies which need additional frequency compensation to keep the feedback loop stable. As the existing resistor divider called feedback ladder at the first output of the switching converter is reused to pump the sensed load current, the additional silicon area requirement is almost negligible. There is also no need for extra loop compensation.

In a further development the linear regulator comprises a resistor divider which is coupled between the second output and the reference potential terminal, and an amplifier. The resistor divider has a first and second resistor connected in series. The amplifier has a first input to be supplied with a reference voltage, a second input which is coupled to the second output via the second resistor of the resistor divider and an output respectively coupled to the control input of the coupling resistor and the pass transistor.

The amplifier equalizes the two voltages at its input terminals. The reference voltage is supplied, for instance, by a bandgap reference and serves as a basis for setting the second output voltage of the linear regulator.

A voltage drop across the pass transistor of the linear regulator is defined as the drop-out voltage.

In another embodiment the switching converter further comprises a switching element coupled between the input and the first output of the switching converter and a control logic. The control logic is coupled to the first output of the switching converter via the feedback ladder of resistors and is prepared to control the switching element as a function of the first output voltage.

The switching converter operates in control of the control logic which is part of the feedback loop of the switching converter according to the operating mechanism well-known to those skilled in the art.

In one refinement the switching converter comprises a DC/DC converter.

This DC/DC converter can be realized as buck, boost, buck boost or sepic converter. The realization of the power conversion arrangement is independent of the switching converter's topology.

In another refinement the linear regulator comprises an LDO.

The proposed power conversion arrangement is furthermore independent of the type of pass transistor, PMOS or NMOS, used in this LDO.

In another embodiment the power conversion arrangement comprises at least one other linear regulator switchably connected to the first output of the switching regulator.

In this embodiment the switching converter supplies multiple linear regulators which are switchably connected to its first output. Thereby, the linear regulator with the highest requirement regarding the drop-out voltage is connected to the switching converter.

In one embodiment a power management circuit comprises a power conversion arrangement as described above, an energy source coupled to the input of the switching converter supplying the input voltage and the electrical load connected to the second output of the linear regulator. The electrical load comprises a current source.

The input voltage is transformed into the first output voltage by the switching converter. The linear regulator there from generates the second output voltage with reduced ripple. The second output voltage is provided to the current source in a power efficient way, as the first output voltage of the switching converter is adapted to the actual value of the load current provided to the current source. This results in a variable drop-out voltage with reduced energy consumption in low load conditions.

In one embodiment a method for power conversion comprises the following steps:
  supplying an input voltage,
  providing a first output voltage as a function of the input voltage by means of a switching converter,
  providing a second output voltage as a function of the first output voltage by means of a linear regulator,
  measuring a load current of the linear regulator, and
  adapting the first output voltage as a function of the load current.

The first output voltage is adapted to the currently required load current. Therefore the drop-out voltage across the linear regulator is reduced, which results in reduced power consumption.

BRIEF DESCRIPTION OF THE DRAWINGS

The text below explains aspects of the invention in detail using exemplary embodiments with reference to the drawings. Components and circuit elements that are functionally identical or have the identical effect bear identical reference numbers. In so far as circuit parts or components correspond to one another in function, a description of them will not be repeated in each of the following figures. Therein.

DETAILED DESCRIPTION

Figure 1:
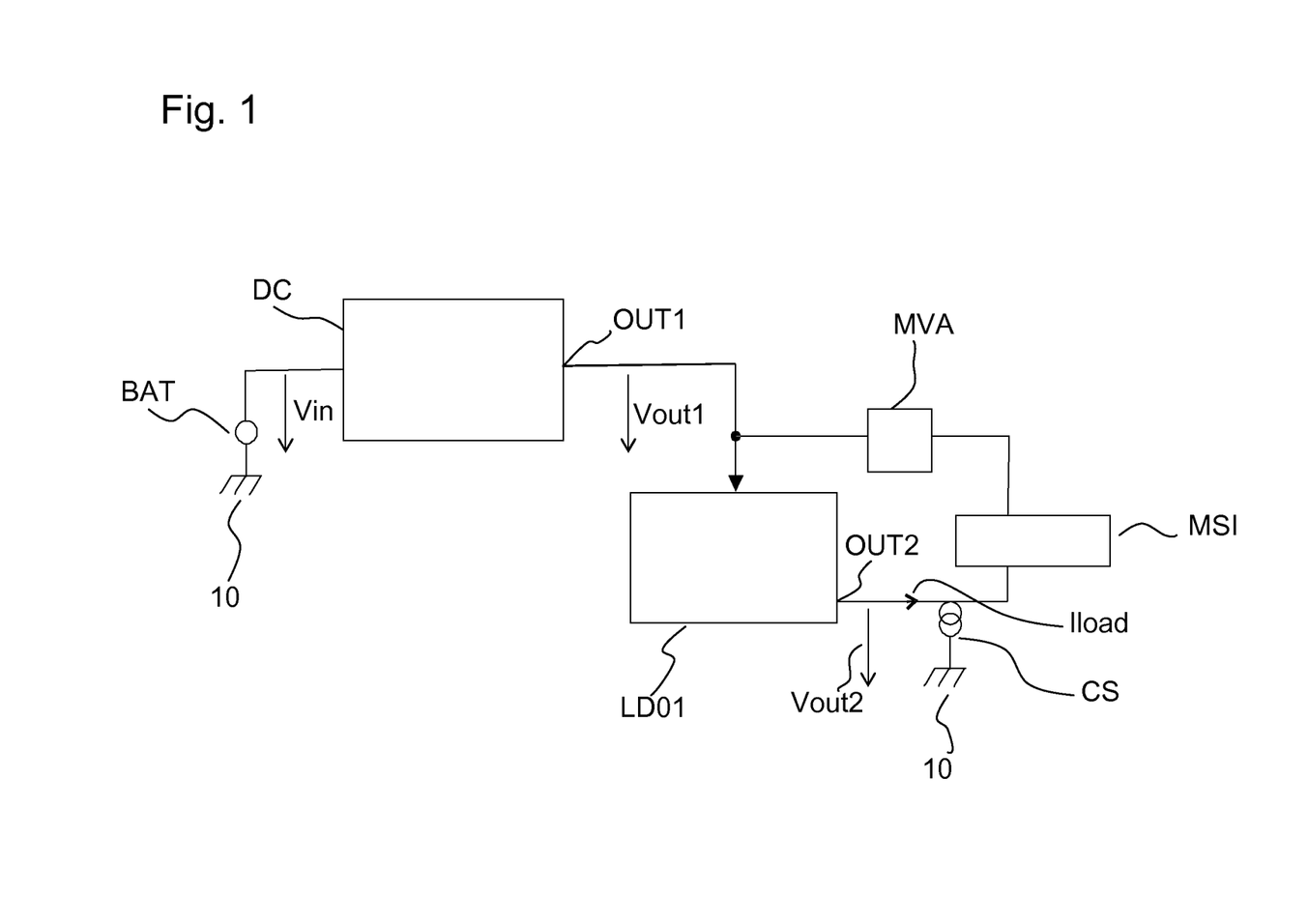
FIG. 1 shows an exemplary embodiment of a power conversion arrangement according to the proposed teaching.

FIG. 1 shows an exemplary embodiment of the power conversion arrangement according to the proposed teaching. The power conversion arrangement comprises a switching converter DC, a linear regulator LDO1, a component MSI for sensing a load current Iload and a unit MVA for influencing a first output voltage Vout1. The switching converter DC has an input which is supplied with an input voltage Vin. The input voltage Vin is supplied by an energy source BAT which can be connected to the input of the switching converter DC. The switching converter DC furthermore has a first output Out1 to provide the first output voltage Vout1. The linear regulator LDO1 is connected with its input to the first output Out1 of the switching converter DC. The linear regulator LDO1 has a second output Out2 to provide a second output voltage Vout2. An electrical load CS can be connected to the second output Out2. The electrical load CS and the energy source BAT are each connected to a reference potential terminal 10 with their respective second terminals. At the second output Out2 a load current Iload is provided to the electrical load CS.

The component MSI for sensing the load current Iload is connected to the second output Out2. The unit MVA for influencing the first output voltage Vout1 is connected to the component MSI for sensing the load current Iload and in a loopback connection to the first output Out1.

The switching converter DC changes the input voltage Vin into the first output voltage Vout1 according to the operating mechanism of a switching converter, for example a DC/DC converter, known to those skilled in the art. The linear regulator LDO1 therefrom generates the second output voltage Vout2 as a function of the first output voltage Vout1. The component MSI for sensing the load current Iload senses the load current Iload at the second output Out2 of the linear regulator LDO1. The unit MVA for influencing the first output voltage Vout1 adjusts the first output voltage Vout1 as a function of the sensed load current Iload.

By adjusting the first output voltage Vout1 to the actually required load current Iload, a voltage drop across the linear regulator LDO1 can be reduced. Consequently, for moderate or light load situations the power dissipation across the linear regulator LDO1 can be reduced and the energetic efficiency of the power conversion arrangement is increased.

Figure 2:
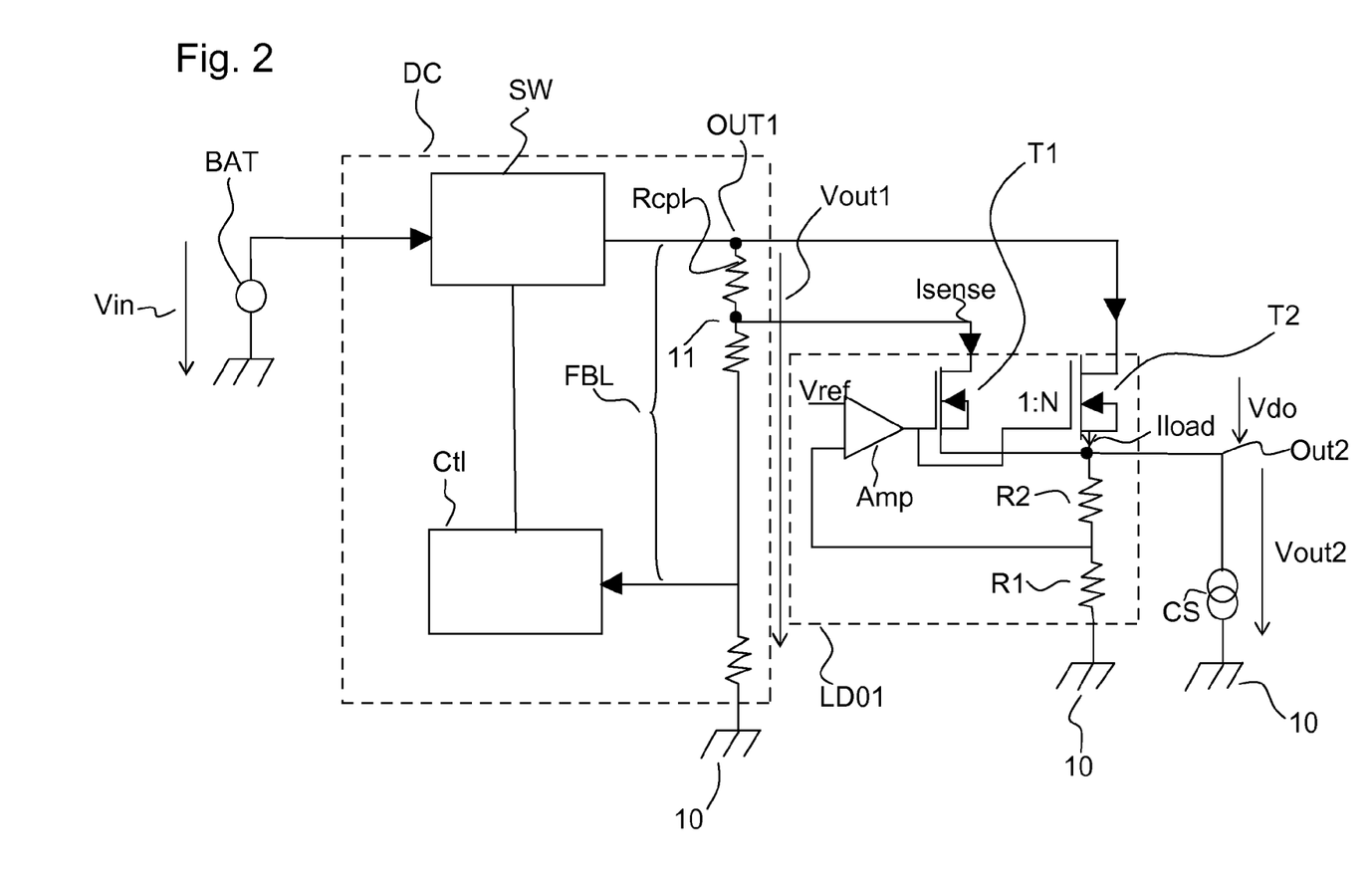
FIG. 2 shows a second exemplary embodiment of a power conversion arrangement according to the proposed teaching.

FIG. 2 shows a second exemplary embodiment of the power conversion arrangement according to the proposed teaching. Here, an implementation example is depicted in detail. The switching converter is realized as a DC/DC converter. The linear regulator LDO1 is implemented as a low drop-out regulator. The switching converter DC comprises a switching element SW connected to the input of the switching converter DC, a feedback ladder FBL of resistor connected to the first output Out1 and a control logic Ctl connected between the switching element SW and the feedback ladder FBL. The feedback ladder FBL comprises a number of resistors connected in series between the first output Out1 and the reference potential terminal 10. The first resistor in the feedback ladder FBL with direct connection to the first output Out1 is reused as a coupling resistor Rcpl. The coupling resistor Rcpl represents an implementation example of the unit MVA for influencing according to FIG. 1.

The linear regulator LDO1 comprises a pass transistor T2 connected between the input of the linear regulator LDO1 and its second output Out2, a sense transistor T1, and amplifier Amp and a resistor divider R1, R2. The sense transistor T1 is connected to the pass transistor T2 to form a current mirror for the load current Iload. The resistor divider R1, R2 comprises a series connection of first and second resistors R1, R2 which is coupled to the second output Out2 and to the reference potential terminal 10. The resistor divider R1, R2 forms a voltage divider for the second output voltage Vout2 provided to the load CS. The amplifier Amp has a first input which is supplied with a reference voltage Vref, a second input which is coupled to a node 11 between first and second resistor R1, R2, and an output which is coupled to respective control inputs of pass transistor T2 and sense transistor T1. A variable drop-out voltage Vdo occurs across the pass transistor T2. The sense transistor T1 represents an exemplary implementation of the component MSI for sensing according to FIG. 1.

The reference voltage Vref which can be provided, for instance, by a bandgap reference, is used to generate the second output voltage Vout2.

The input voltage Vin is converted into the first output voltage Vout1. The first output voltage Vout1 is transformed into the second output voltage Vout2. The load current Iload passing through the pass transistor T2 is mirrored with a ratio of N:1 via the sense transistor T1 which provides the sense current Isense. The sense current Isense is fed back into the feedback ladder FBL by means of the coupling resistor Rcpl at node 12. The control logic Ctl influences the switching element SW such that the first output voltage Vout1 is adapted to the currently required load current Iload. The drop-out voltage Vdo adapts accordingly as the second output voltage Vout2 is kept at a fixed level.

In other than peak load conditions, a reduction in the drop-out voltage Vdo is achieved. The total change in the drop-out voltage Vdo amounts to $$\Delta Vdo = Isense*Rcpl = Iload*Rcpl/N.$$

The effective power saving that can be achieved is equal to $$(Ipeak - Iload)*Iload*Rcpl/N$$

for a predefined peak value Ipeak of the load current Iload.

Therein $\Delta VDO$ represents the change in the drop-out voltage Vdo, Isense represents the sense current Isense, Rcpl represents the coupling resistor Rcpl, Iload is the load current Iload, N is the ratio N realized by the current mirror formed by transistors T1, T2.

In other words, the first output voltage Vout1 scales with the sense current Isense. A voltage at node 12, at which the sense current Isense is fed back to the feedback ladder FBL, is fixed and is completely controlled by the feedback within the switching converter DC.

The lower limit of the drop-out voltage Vdo is defined by the linear regulator LDO1 driver stage and the operating point requirements of the pass transistor T2.

Figure 3:
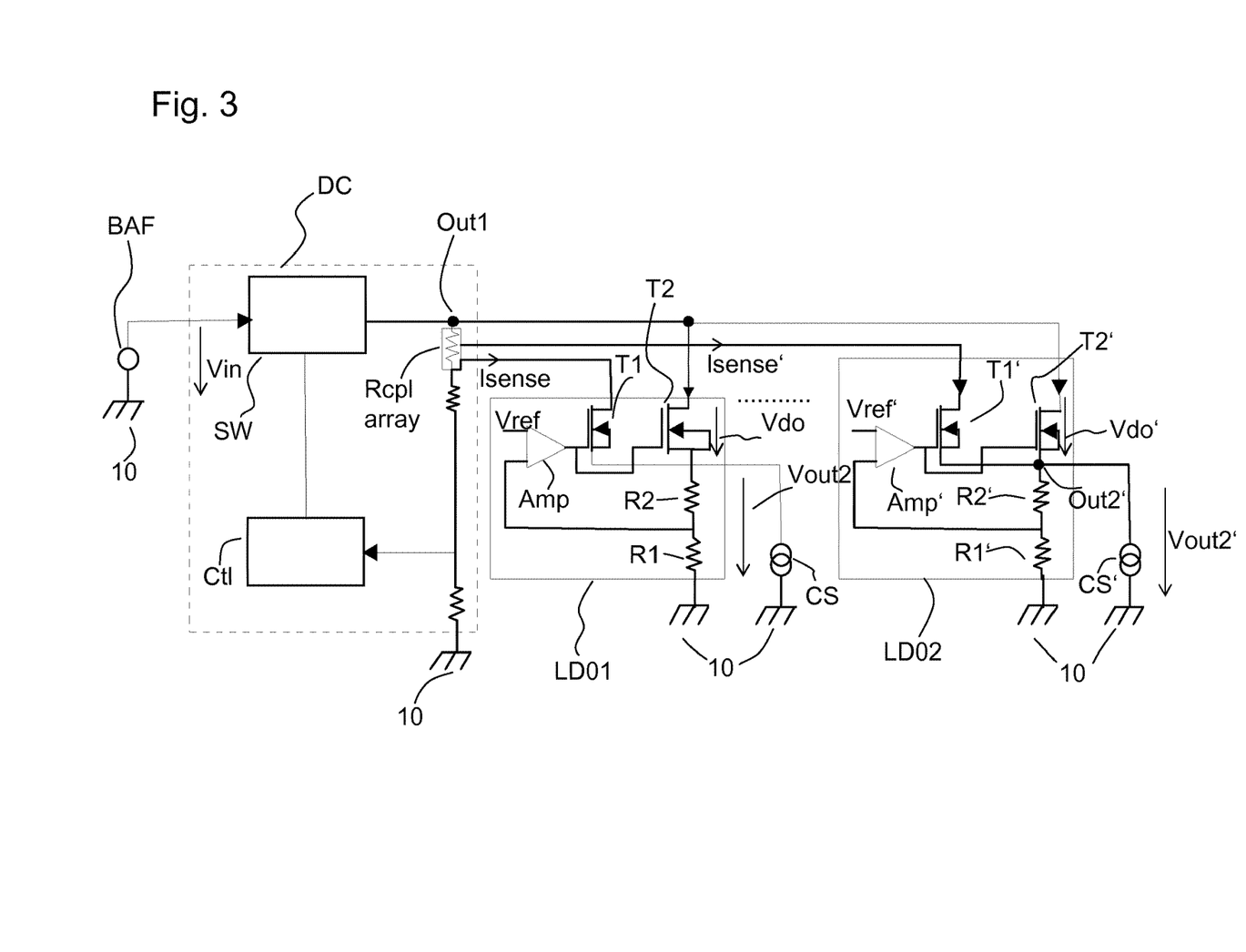
FIG. 3 shows a third exemplary embodiment of a power conversion arrangement according to the proposed teaching.

FIG. 3 shows a third exemplary embodiment of a power conversion arrangement according to the proposed teaching. In addition to the embodiment shown in FIG. 2, the third embodiment comprises at least one other linear regulator LDO2. This at least one other linear regulator LDO2 is connected to the first output Out1 of the switching converter DC in a switchable manner. It is realized in a way which is equivalent to the linear regulator LDO1. Each additional linear regulator has its own coupling resistor Rcpl via which it is connected to the first output Out1. By this, an array of coupling resistors Rcpl is created.

The at least one other linear regulator LDO2 generates another sense current Isense' as a function of its load current Iload' at its second output Out2'. As each linear regulator LDO1, LDO2 generates a second output voltage Vout2, Vout2' at different levels, the linear regulator LDO1, LDO2 with the highest sense current Isense, Isense' is connected to the first output Out1 of the switching converter DC.

It is clear to those skilled in the art that the number of linear regulators that can be connected to the first output Out1 of the switching converter DC is not limited to two.

Figure 4:
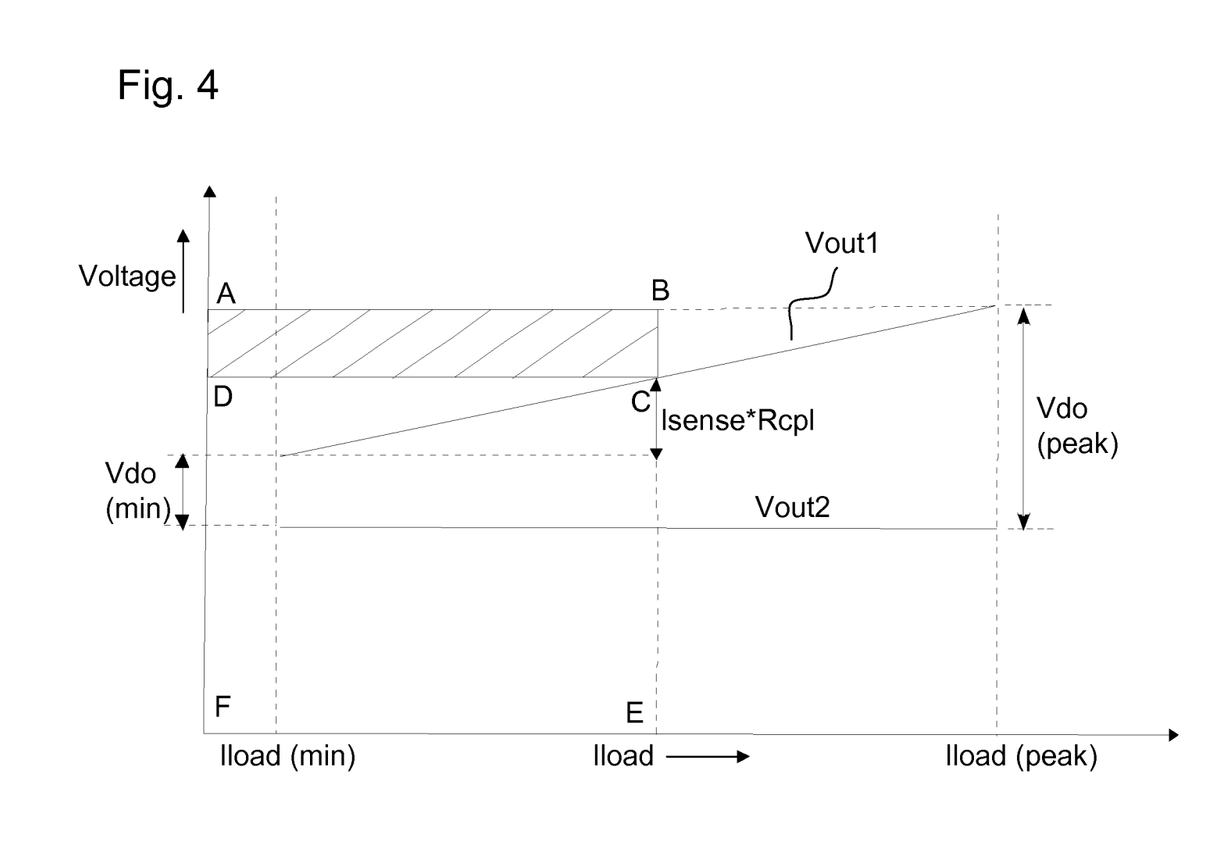
FIG. 4 shows exemplary diagrams relating to the second exemplary embodiment of FIG. 2.

FIG. 4 shows exemplary diagrams for the exemplary embodiment of FIG. 2. On the x-axis the load current Iload is depicted. The y-axis shows different voltage curves. Therein, the inclined line in the upper part represents the first output voltage Vout1 and the bottom line represents the second output voltage Vout2. The distance between the first output voltage Vout1 and the second output voltage Vout2 is the drop-out voltage Vdo. The load current Iload varies between a minimum and a peak value. A minimum value Vdo (min) of the drop-out voltage Vdo represents said lower limit of the drop-out voltage Vdo.

The second output voltage Vout2 is maintained constant across the load variation, whereas the first output voltage Vout1 adapts itself as a function of the load current Iload. A load point C moves on the Vout1 line from the minimum load current Iload(min) to the maximum load current Iload (max). An area defined by the rectangle ABEF corresponds to the power dissipated without using the described teaching, i.e. without adaptation of the first output voltage Vout1. An area defined by the rectangle DCEF corresponds to the power dissipated while using the described teaching, i.e. influencing the first output voltage Vout1 as a function of the load current Iload. Hence the power saved by using the adaptable first output voltage Vout1 with variable dropout voltage Vdo is given by the difference of the above two rectangles, which is indicated by the shaded region ABCD.

Figure 5:
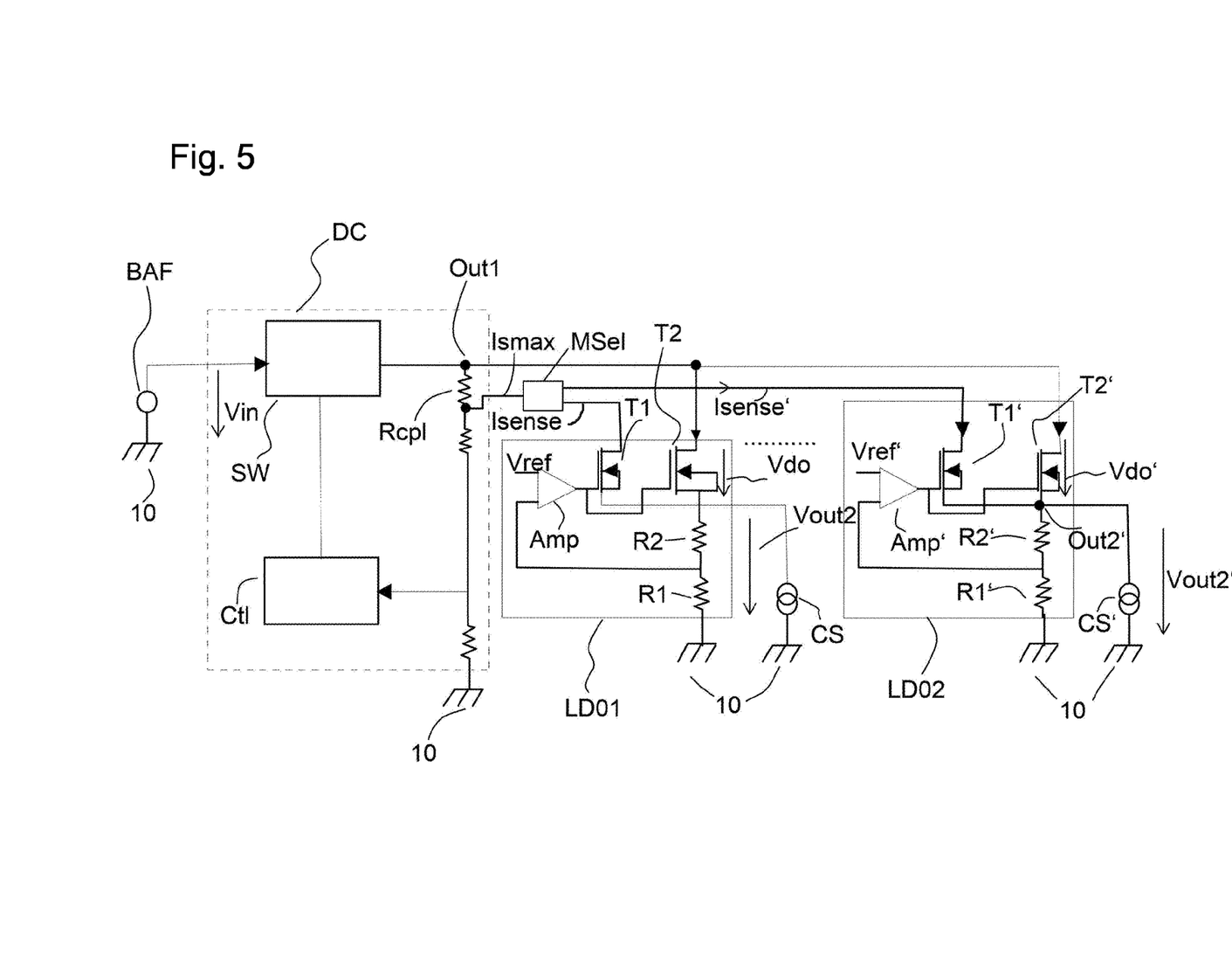
FIG. 5 shows another exemplary embodiment of a power conversion arrangement according to the proposed teaching.

FIG. 5 shows another exemplary embodiment of a power conversion arrangement according to the proposed teaching. This embodiment is based on the embodiment depicted in FIG. 3. In addition to the embodiment shown in FIG. 3, the embodiment in FIG. 5 comprises a maximum current selector MSel. Instead of the array of coupling resistors Rcpl used in FIG. 3, the embodiment of FIG. 5 has just one coupling resistor Rcpl. The maximum current selector MSel receives the sense current Isense from the first linear regulator LDO1 and at least the sense current Isense' from the other linear regulator LDO2. The maximum current selector MSel provides a maximum sense current Ismax to the coupling resistor Rcpl. The maximum sense current Ismax corresponds to the sense current Isense or Isense' with the highest value. The first output voltage Vout1 is consequently adapted as a function of the maximum sense current Ismax. Thus, the switching converter's DC output voltage Vout1 is adjusted based on the highest dropout requirement among all the LDOs.

The invention claimed is:

1. A power conversion arrangement comprising:
    a switching converter with an input which is supplied with an input voltage and a first output to provide a first output voltage as a function of the input voltage;
    a linear regulator with an input coupled to the first output of the switching converter, the linear regulator having a second output to provide a second output voltage as a function of the first output voltage to a connectable electrical load;
    a component for sensing a load current at the second output of the linear regulator, the component being connected to the second output of the linear regulator; and
    a unit for influencing the first output voltage as a function of the load current, the unit being connected to the first output of the switching converter and to the component for sensing the load current,
    wherein the first output voltage is adapted to the currently required load current,
    wherein the switching converter comprises a feedback ladder of resistors having a serial connection of resistors, the feedback ladder being connected to the first output of the switching converter,
    wherein a coupling resistor is provided which is connected to the first output of the switching converter, the coupling resistor forming part of the feedback ladder of the switching converter,
    wherein the coupling resistor implements the unit for influencing the first output voltage, and
    wherein the serial connection of resistors is connected to the output of the switching converter and to a reference potential terminal.

2. The power conversion arrangement according to claim 1, wherein the linear regulator comprises a sense transistor coupled to the second output, the sense transistor being prepared to measure the load current.

3. The power conversion arrangement according to claim 1, wherein the switching converter further comprises:
    a switching element coupled between the input and the first output of the switching converter; and
    a control logic coupled to the first output of the switching converter via the feedback ladder of resistors, the control logic being prepared to control the switching element as a function of the first output voltage.

4. The power conversion arrangement according to claim 1, wherein the switching converter comprises a DC/DC-converter.

5. The power conversion arrangement according to claim 1, wherein the linear regulator comprises a low drop-out regulator.

6. The power conversion arrangement according to claim 1, comprising at least one other linear regulator switchably connected to the first output of the switching converter.

7. A power management circuit, comprising:
    a power conversion arrangement according to claim 1;
    an energy source coupled to the input of the switching converter supplying the input voltage; and
    the electrical load connected to the second output of the linear regulator, the electrical load comprising a current source.

8. The power conversion arrangement according to claim 1, wherein the coupling resistor is coupled directly to the first output of the switching converter.

9. The power conversion arrangement according to claim 1, wherein the linear regulator comprises:
    a sense transistor coupled to the second output;
    a pass transistor connected between the input of the linear regulator and the second output and, wherein the gate of the sense transistor is connected to the gate of the pass transistor, wherein the source of the sense transistor is connected to the source of the pass transistor, and wherein the sense transistor is adapted to form a current mirror in connection with the pass transistor;
    a resistor divider which is coupled between the second output of the linear regulator and a reference potential terminal, the resistor divider having a first resistor and a second resistor connected in series; and
    an amplifier with a first input to be supplied with a reference voltage, a second input which is coupled to the second output via the second resistor of the resistor divider, and with an output respectively coupled to a control input of the sense transistor and the pass transistor.

10. The power conversion arrangement according to claim 2, wherein the linear regulator further comprises a pass transistor with a controlled path connected between the input of the linear regulator and the second output and, and
    wherein the sense transistor is adapted to form a current mirror in connection with the pass transistor for the load current through the pass transistor.

11. The power conversion arrangement according to claim 2, wherein the sense transistor is adapted to provide a sense current as a function of the load current.

12. The power management circuit of claim 7, further comprising at least one other linear regulator switchably connected to the first output of the switching converter.

13. The power conversion arrangement according to claim 10, wherein the linear regulator further comprises:
    a resistor divider which is coupled between the second output of the linear regulator and a reference potential terminal, the resistor divider having a first resistor and a second resistor connected in series; and
    an amplifier with a first input to be supplied with a reference voltage, a second input which is coupled to the second output via the second resistor of the resistor divider, and with an output respectively coupled to a control input of the sense transistor and the pass transistor.

14. A method for power conversion comprising the following steps:
    supplying an input voltage;
    providing a first output voltage as a function of the input voltage by means of a switching converter at a first output of the switching converter;
    providing a second output voltage as a function of the first output voltage by means of a linear regulator at a second output of the linear regulator;
    measuring a load current of the linear regulator at the second output of the linear regulator; and
    adapting the first output voltage as a function of the currently required load current by a unit for influencing the first output voltage,
    wherein the switching converter comprises a feedback ladder of resistors having a serial connection of resistors, the feedback ladder being connected to the first output of the switching converter, wherein a coupling resistor is provided which is connected to the first output of the switching converter, the coupling resistor forming part of the feedback ladder of the switching converter, wherein the coupling resistor implements the unit for influencing the first output voltage, and wherein the serial connection of resistors is connected to the output of the switching converter and to a reference potential terminal.

15. A power conversion arrangement comprising:

a switching converter with an input which is supplied with an input voltage and a first output to provide a first output voltage as a function of the input voltage;

a linear regulator with an input coupled to the first output of the switching converter, the linear regulator having a second output to provide a second output voltage as a function of the first output voltage to a connectable electrical load;

a component for sensing a load current at the second output of the linear regulator, the component being connected to the second output of the linear regulator; and a unit for influencing the first output voltage as a function of the load current, the unit being connected to the first output of the switching converter and to the component for sensing the load current, wherein the first output voltage is adapted to the currently required load current, wherein the switching converter comprises a feedback ladder of resistors having a serial connection of resistors, the feedback ladder being connected to the first output of the switching converter, wherein a coupling resistor is provided which is connected to the first output of the switching converter, the coupling resistor forming part of the feedback ladder of the switching converter, wherein the coupling resistor implements the unit for influencing the first output voltage, wherein the serial connection of resistors is connected to the output of the switching converter and to a reference potential terminal, wherein the linear regulator comprises a sense transistor coupled to the second output, the sense transistor being prepared to measure the load current, wherein the sense transistor is adapted to provide a sense current as a function of the load current, and wherein the sense current is fed back to the first output of the switching converter by means of the coupling resister, thereby influencing and adapting the first output voltage.

* * * * *